March 10, 1936.  A. H. RINEY ET AL  2,033,255
LIQUID DISPENSING APPARATUS
Filed Dec. 27, 1932  2 Sheets-Sheet 1
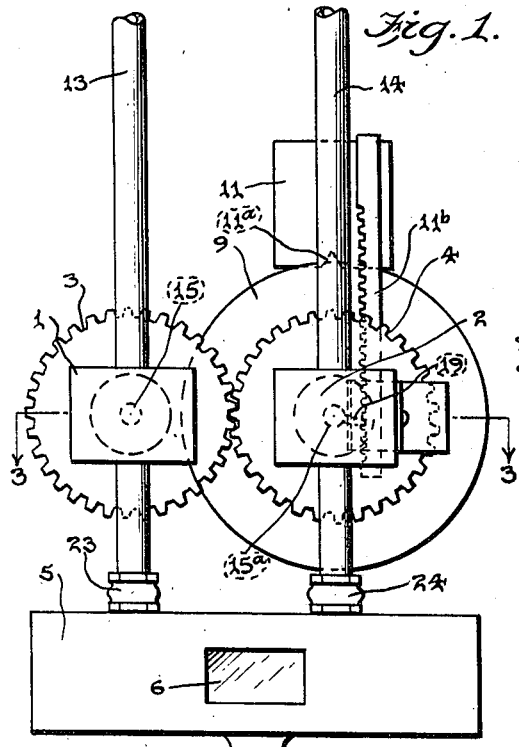
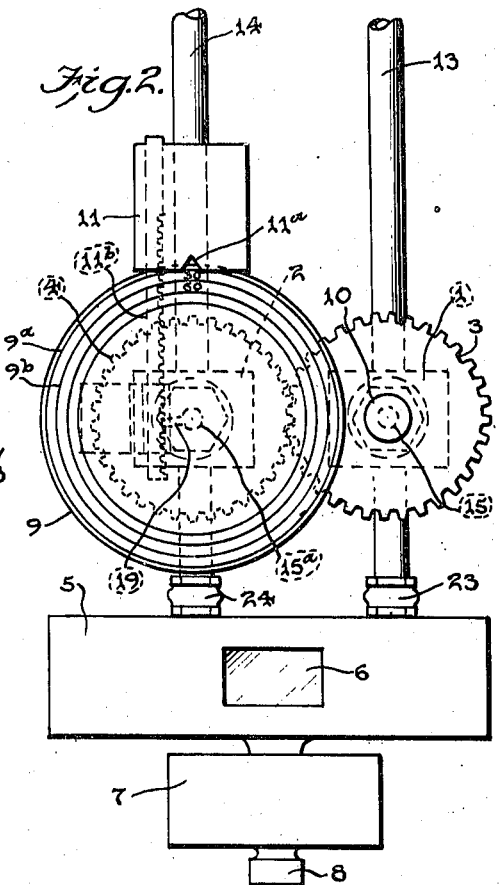
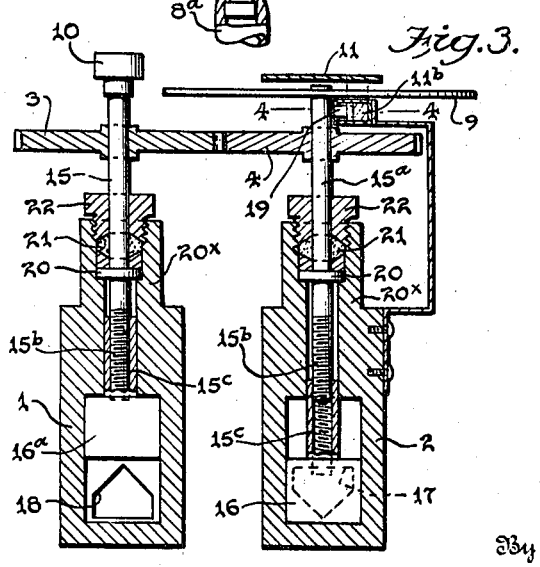
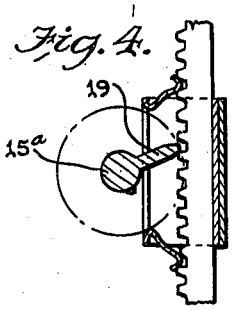
Inventors
Arthur H. Riney
Lloyd T. Gibbs,
By Robt. E. Barry
Attorney

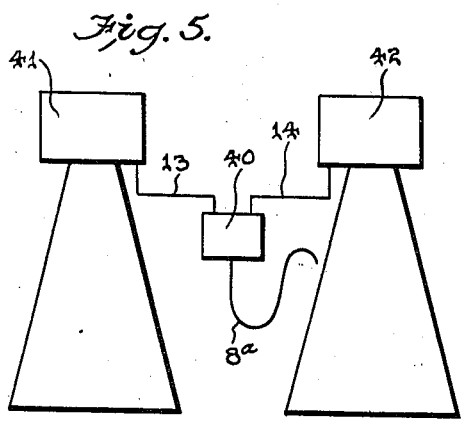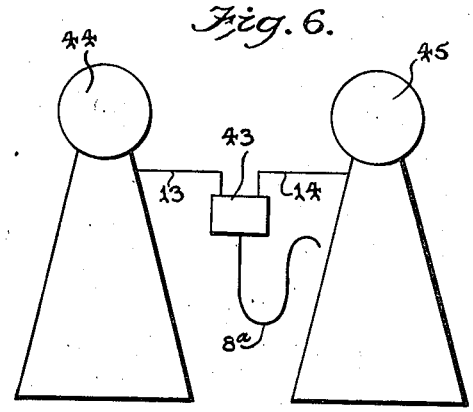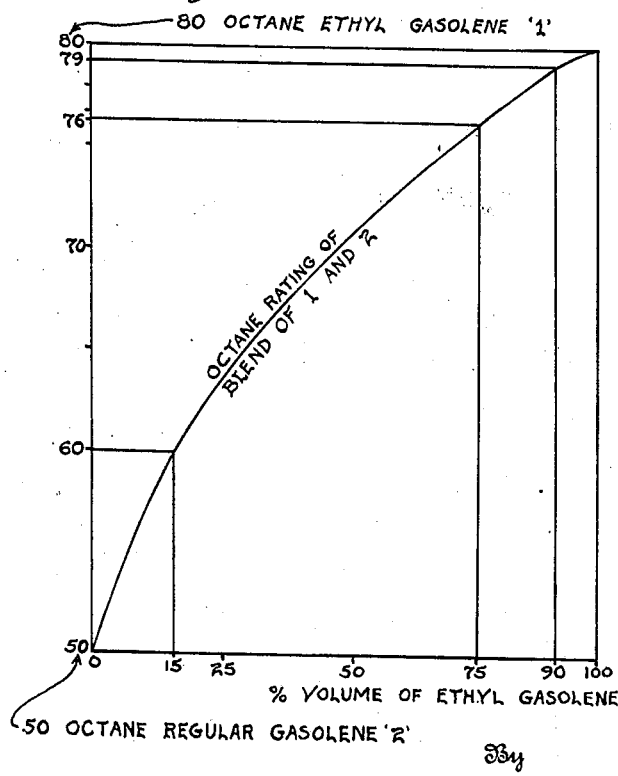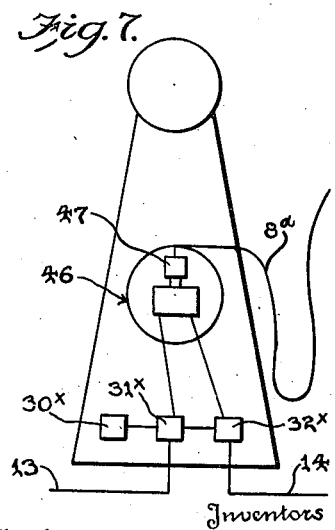

Patented Mar. 10, 1936

2,033,255

UNITED STATES PATENT OFFICE 2,033,255

LIQUID DISPENSING APPARATUS

Arthur H. Riney and Lloyd T. Gibbs, Bartlesville, Okla., assignors to Phillips Petroleum Company, Bartlesville, Okla., a corporation of Delaware Application December 27, 1932, Serial No. 649,090

6 Claims. (Cl. 116—125)

This invention relates to improvements in liquid dispensing apparatus, and more especially to novel means for blending or mixing a plurality of different liquids in desired proportions while in the act of dispensing such liquids.

Our apparatus is particularly suitable for, although not necessarily limited to, dispensing motor fuels and oils. With the aid of the apparatus, every filling station can become a blending plant—blending two or more liquids, so as to impart any desired characteristics to the resulting liquid mixture. For example, the blending of a plurality of gasolines, each having a different octane rating or volatility rating, or both, may be accomplished, whereby such liquids may be combined in any desired blend having any desired octane or volatility rating between the limits of the octane or volatility rating of the original liquids.

The apparatus consists primarily of a means for changing the rate of flow of a plurality of liquids from two or more different sources of supply into a mixing box, or directly into the fuel tank of an automobile. Various means can be supplied for accomplishing this result. For example, means of changing the rate of flow from each source can be accomplished by a sliding system of orifice devices of certain sizes to give certain desired flows; or in other words, orifices through which the liquids flow may be variably controlled to regulate the flow of the liquids simultaneously through the orifices.

With the foregoing objects outlined and with other objects in view which will appear as the description proceeds, the invention consists in the novel features hereinafter described in detail, illustrated in the accompanying drawings, and more particularly pointed out in the appended claims.

In the drawings,

Fig. 1 is an elevation of one form of apparatus which we propose to install between the supply tanks of a plurality of liquids and a common outlet for the liquids after they are mixed.

Fig. 2 is a similar view looking from the opposite side of the apparatus.

Fig. 3 is a horizontal sectional view taken on the line 3—3 of Fig. 1.

Fig. 4 is a vertical sectional view of a detail, taken on the line 4—4 of Fig. 3.

Fig. 5 is a diagrammatic view illustrating the manner in which the apparatus may be attached to two visible bowl pumps.

Fig. 6 is a similar view showing the apparatus used with two meter pumps.

Fig. 7 is a diagrammatic view illustrating the application of the apparatus to a vending device in which a plurality of fuels may be dispensed from a single pump.

Fig. 8 is a curve sheet illustrating the results of blending gasolines in various percentages by volume.

Referring first to Figs. 1 to 4 inclusive of the drawings, 13 designates a pipe leading from one source of liquid, and 14 a pipe leading from a second source of liquid. These pipes empty into a mixing box 5 having a window 6, and from the box 5 the mixture may pass through a meter 7 and valve 8 before entering the hose 8ª of a dispensing apparatus.

If the apparatus is employed in dispensing two different kinds of motor fuels, pipe 13 will be connected to a supply of base gasoline, which may be assumed to have an octane number of "50", while pipe 14 will be connected to a second source of supply containing a high octane gasoline, say rated at "80" octane number. One purpose of the invention is to be able to form a blend of any octane number gasoline between "50" and "80" for the customers' use.

In accordance with the invention, to accomplish this result, valve casings or devices 1 and 2 are interposed respectively in the pipes 13 and 14. From Fig. 3, it will be noted that the casing 1 includes an orifice or stationary port 18, while the casing 2 includes an orifice or stationary port 17. These orifices are controlled respectively by sliding plates or gate valves 16ª and 16 which are suitably guided and packed, and are actuated respectively by stems 15 and 15ª. Each stem has screw threads 15ᵇ which engage the internal threads of sockets 15ᶜ that are fixedly attached to the sliding plates 16ª and 16.

The stems are geared together by gears 3 and 4, preferably of equal diameter, and as these gears mesh at all times, it will be understood that if the knob 10 is turned to rotate the stem 15, the threads 15ᵇ will move the sliding plate 16ª in one direction, while the stem 15ª will rotate in the opposite direction and act to move the sliding plate 16 in a direction reverse to the direction of movement of the plate 16ª. Consequently, while one orifice is being closed, the other one is being opened.

A dial 9 is fixed to the stem 15ª and is provided on its face with concentric indicating rings 9ª and 9ᵇ, etc., which cooperate with a shield 11 having a notch 11ª for registration with numbers 30, 60, etc., on the rings 9ª and 9ᵇ. The shield is carried by a rack 11ᵇ that is frictionally supported by any suitable means, and is actuated by a pawl or tooth 19 on the stem 15a. Each time that stem is rotated, the rack will be raised or lowered one notch, depending on the direction of rotation.

Each of the stems is preferably provided with a circular flange 20 that rotates in an extension 20x of its particular valve case, and acts to prevent axial movement of the stem. Each extension 20x is preferably packed by means of a suitable packing ring 21 and an adjustable gland 22 to prevent leakage along the stem.

It will be noted that the orifices 17, 18 are of the same shape, (pentagonal), but the points of the two openings are reversed. The sum of the areas of the orifices is always constant for any position of the knob 10 and disk 9, or any position of the plates 16, 16a, and is equal to the opening of the area 17, which in turn is equal to the opening of the area 18.

While we have shown the orifices of special shape, it is evident that the orifices might be made of regular shape, and the movable plates 16, 16a could be changed in shape so that very accurate amounts of ethylized gasoline, for example, can be added to the mixture, at the beginning of the blending operation. Stated another way, one revolution of the knob 10 or the disk 9, will change the volume flowing through the opening 17 a small percent at the beginning of the outward or opening movement of the sliding plate 16. One revolution of the knob 10 or the disk 9, will change the volume to a greater extent in the last one-half of the outward or opening travel of the slide 16. It may, therefore, be seen that accurate blending is obtained on the lower percent blends, (percent in terms of ethylized gasoline), which is the range where small changes in ratio of the two gasolines produces marked changes in octane rating.

The orifices are to be calibrated so that the disk 9 mounted on the valve casing or device 2, will indicate the ratio of the mixture entering the box 5, or this calibration can be calibrated in octane numbers of the mixture. The valve structures 1 and 2 can be made so that it will require several complete revolutions of the disk 9 or the knob 10, to completely close or open either orifice, and the shield 11 cooperating with the disk 9 will properly indicate the octane number of the product, or the mixture of the same, as the shield will act to cover or uncover numbers such as 30, 60 on the various concentric circles 9a, 9b, etc., corresponding to each revolution of the disk 9.

The liquids from the two sources of supply can thus be made to enter the box 5 at any predetermined rate of flow, and one looking through the window 6 may observe what is taking place. From the box, the mixed liquids pass through meter 7 and valve 8, and through the hose 8a to the customers' car. Valves 23 and 24 can be interposed in the pipes 13 and 14, between the orifice devices and the mixing box 5, and these valves can be used in connection with the valve 8, so that if the fuel tank of one car has been filled with a certain mixture of motor fuels, the mixture remaining in the box 5 and meter 7 can be drained through the hose 8a to a sump tank, whereby when the next customer desires a special mixture, there will be no contamination in the equipment between the valve casings 1 and 2, and the next customer's fuel tank. This inconvenience may be eliminated by making the pipes 13 and 14 flexible, omitting parts 5, 6, 7 and 8, and by building the proportioning or blending apparatus into a common nozzle which would form the outlet of both pipes 13 and 14.

The shape of the openings 17 and 18, and the shape of the sliding plates 16 and 16a can be so arranged as to determine the rate of flow change for each revolution of the disk 9.

By way of further explanation of the use of the apparatus, it will be observed that if an ethylized gasoline is blended with an unethylized gasoline in various percentages by volume, typical results of the kind shown in Fig. 8 may be obtained. From this figure it may be seen that the first small blend of ethyl gasoline with the base gasoline has a much greater effect than the same amount blended later; i. e., the first 15% added by volume adds approximately 10% to the octane rating of the blended gasoline, but 15% added above 75%, adds only approximately three points to the octane rating of the blended gasoline. It is evident therefore that the first amount of ethylized gasoline added is the most important, and does the most good in relation to the volume added, than later additions of the same amount.

In Figs. 5 to 7 inclusive, we have illustrated a few adaptations of our apparatus. For instance, Fig. 5 shows the apparatus designated for convenience 40, installed in an existing station which has visible bowl pumps 41 and 42. The device is connected to the two pumps, as shown, with no major changes at the station. Obviously, a pair of the devices shown in Figs. 1, 2 and 3 might be connected to the two pumps 41 and 42, so that two customers may be served from the two pumps at the same time, each with a different blend, if desired.

Fig. 6 shows the same proportioning apparatus 43 connected to two meter type pumps 44, 45, and the remarks relative to Fig. 5 are also true of the construction shown in Fig. 6.

Fig. 7 shows the proportioning apparatus 46 installed in a vending device used for a new installation, as shown. The new vending device has a motor 30x driving two pumps 31x and 32x, which feed the proportioning apparatus. The characteristics of the pumps 31x and 32x should be the same so that when they are driven at exactly the same speed, they both deliver similar streams under identical pressures. One pump 31x is connected to one source of supply by the line 13, and the other to another source of supply by the line 14. Of course, each source of supply will contain gasoline differing from the other. Pumps 31x and 32x discharge into the proportioning apparatus 46, and the blend travels from the latter, first through the meter 47, and then through the hose 8a to the fuel tank of the customer's car.

It is obvious that this apparatus is of great economical importance, due to the fact that each individual car owner can determine the quality of gasoline which will best operate his car, and call for the same. Instead of paying a premium price for the total quantity placed in his car, it will be possible to pay a premium on a percent basis, determined by himself, of the quantity placed in the car.

Another economic value is that two grades of gasoline will replace three or more now being handled, reducing the investment in storage tanks, pumps, etc.; while these two grades will make available to the public an infinite number of grades, either with respect to octane number, or volatility, or both.

Another advantage is that the two gasolines to be blended may or can have different volatility ratings, and the volatility can be changed according to the weather—different, if desired, for each filling of the car, according to the desire of the car owner.

Another advantage is that automobiles can be built for a definite octane rating to promote greater efficiency and economy, with the assurance that the car owner can obtain that specified octane rated gasoline and will not be forced to buy either a better grade or a poorer grade of gasoline with respect to either the octane rating or the volatility.

While we have disclosed one embodiment of our improved apparatus and a number of applications of the same to gasoline dispensing pumps, it is manifest that the apparatus may be used for the blending of various other liquids, and changes may be made in the details disclosed, without departing from the spirit of the invention, as expressed in the claims.

What is claimed and desired to be secured by Letters Patent is:

1. In an apparatus of the character described, a pair of supply pipes, a common outlet device for both pipes, orifices interposed in the supply pipes, a sliding plate valve for each orifice, means for simultaneously actuating said valves in such manner that one gradually uncovers the area of its orifice, while the other decreases the exposed area of its orifice, a disc secured to the valve actuating means, a shield, means operatively connected to said valve-actuating means for sliding said shield across the face of said disc each time said valve actuating means is actuated, and cooperating means on the shield and disc for indicating the position of both valves in relation to each other.

2. In an apparatus of the character described, a pair of supply pipes, a common outlet device for both pipes, orifices interposed in the supply pipes, a sliding plate valve for each orifice, rotatable interconnected stems secured to said valves in such manner as to cause one valve to gradually uncover the area of its orifice while the other valve gradually decreases the exposed area of its orifice, a disc secured to one of said stems, a shield, means operatively connected to said last mentioned stem for sliding said shield across the face of said disc each time the stems are rotated, and cooperating means on the shield and disc for indicating the position of both valves in relation to each other.

3. In an apparatus of the character described, a pair of supply pipes, a common outlet device for both pipes, orifices interposed in the supply pipes, a sliding plate valve for each orifice, said valves being arranged at right angles to the flow of fluid through said orifices, rotatable interconnected stems secured to said valves in such manner as to cause one valve to gradually uncover the area of its orifice while the other valve gradually decreases the exposed area of its orifice, a disc secured to one of said stems, a shield, means operatively connected to said last mentioned stem for sliding said shield across the face of said disc each time the stems are rotated, and cooperating means on the shield and disc for indicating the position of both valves in relation to each other.

4. In an apparatus of the character described, a pair of supply pipes, a common outlet device for both pipes, orifices interposed in the supply pipes, a valve for each orifice, rotatable interconnected stems secured to said valves in such manner as to cause one of said valves to gradually uncover the area of its orifice while the other valve gradually decreases the exposed area of its orifice, a disc fixed to one of said stems and having concentric rings on one face thereof, a rack bar, a tooth on said last mentioned stem for actuating the rack bar each time the stem is rotated, and a shield actuated by the rack bar for movement across the face of said disc, said shield having means cooperating with said concentric rings for indicating the position of both valves in relation to each other.

5. In an apparatus of the character described, a pair of supply pipes, a common outlet device for both pipes, stationary ports interposed in the supply pipes, a gate valve for each port, and means for simultaneously moving said valves in such manner that one uncovers its port while the other closes its port, each port being of pentagonal shape, and the points of the pentagons of the two ports being reversed to each other.

6. In an apparatus of the character described, a pair of supply pipes, a common outlet device for both pipes, stationary pentagonal shaped ports interposed in the supply pipes, the point of the pentagons of the two ports being reversed to each other, a sliding plate valve for each port, said valves being arranged at right angles with respect to the flow of fluid through said ports, and means for simultaneously moving said valves in opposite directions toward the point of the respective ports, thereby gradually uncovering the area of one port while decreasing the exposed area of the other port.

ARTHUR H. RINEY.
LLOYD T. GIBBS.